(12) United States Patent
Ho et al.

(10) Patent No.: US 7,796,208 B2
(45) Date of Patent: Sep. 14, 2010

(54) DISPLAY DEVICE AND BACKLIGHT APPARATUS THEREOF COMPRISING SPECIFIC FIXING MEMBER

(75) Inventors: Ming-Hsuen Ho, Hsinchu (TW);
Sheng-Chieh Lung, Hsinchu (TW);
Ying-Hsi Yeh, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 196 days.

(21) Appl. No.: 11/971,241

(22) Filed: Jan. 9, 2008

(65) Prior Publication Data
US 2009/0109370 A1 Apr. 30, 2009

(30) Foreign Application Priority Data
Oct. 30, 2007 (TW) .............................. 96140740 A

(51) Int. Cl.
*G02F 1/1335* (2006.01)
*G09F 13/04* (2006.01)
*G09F 13/08* (2006.01)
*F21V 19/02* (2006.01)
*F21V 15/00* (2006.01)

(52) U.S. Cl. .................... 349/61; 362/285; 362/367; 362/97.1; 349/58

(58) Field of Classification Search ....... 362/97.1–97.4, 362/285, 365, 367, 368, 249.01–249.03, 362/402, 449, 612, 613, 630–634; 349/69, 349/61
See application file for complete search history.

(56) References Cited

U.S. PATENT DOCUMENTS

2006/0279946 A1* 12/2006 Park et al. ................... 362/97
2009/0046445 A1* 2/2009 Namiki et al. ............ 362/97.2

FOREIGN PATENT DOCUMENTS

| CN | 1743919 | 8/2005 |
| CN | 1648743 | 3/2006 |
| WO | WO 2007029692 A1 * | 3/2007 |

OTHER PUBLICATIONS

English Abstract of Chinese Patent Application Publication No. 1648743.
English Abstract of Chinese Patent Application Publication No. 1743919.

* cited by examiner

*Primary Examiner*—Andrew Schechter
*Assistant Examiner*—Michael Inadomi
(74) *Attorney, Agent, or Firm*—Thomas, Kayden, Horstemeyer & Risley

(57) ABSTRACT

A display device includes a cover. A back light apparatus, a set of optical films, and a liquid crystal display module are disposed behind the cover. The back light apparatus includes a planar bezel and a light source module. The planar bezel has a lengthwise opening. The light source module has a bar, a light source disposed on the bar, and a fixing member. The bar is partially or totally disposed in the lengthwise opening of the planar bezel and both the planar bezel and the bar are combined by the fixing member. The light source is disposed on the bar and provides the light beam to the liquid crystal display module.

7 Claims, 8 Drawing Sheets

DISPLAY DEVICE AND BACKLIGHT APPARATUS THEREOF COMPRISING SPECIFIC FIXING MEMBER

BACKGROUND OF THE INVENTION

1. Field of the Invention

The invention relates to a display device and backlight apparatus thereof, and more particularly, to a liquid crystal display device and backlight apparatus thereof.

2. Description of the Related Art

A liquid crystal display (LCD) is a full color display using liquid crystal technology. LCDs are widely applied in digital cameras, personal digital assistants (PDAs), TV sets, and a plurality of consumer products. The difference between an LCD and a cathode ray tube (CRT) display is mainly the light source. The LCD requires an extra light source disposed at the back of an LCD module to provide a light beam. This kind of light source structure is also called a backlight module.

There are different types of back light modules, such as edge lighting or direct lighting types. The direct lighting type is the most common type of back light module applied in large-sized LCD. The direct lighting type comprises a plurality of light sources and one or more optical films. During operation, light sources provide light beams to the display screen through optical films and color filters.

As shown in FIG. 1 as a cross-sectional view, reference numeral 98 refers to a liquid crystal module. A conventional backlight module 90 comprises diffuser films 97, a base 91 and a detachable base 92. The base 91 is rectangular and comprises metal with good heat conductivity. Additionally, the base 91 has a rectangular fillister 911. Inclined planes 912 extend on both sides of the fillister 911. A reflecting member 93 attaches to the inclined plane 912 and a V-shaped light guide member 94 attaches to the reflecting member 93. A hollowed space 941 is disposed in the center of the light guide member 94. A light source 95 is disposed on a rectangular detachable base 92. The fillister 911 is able to accommodate the detachable base 92 and the hollowed space 941 is able to accommodate the light source 95. Therefore, the fillister 911 can be opened to remove the detachable base 92 and light source 95 whenever there is a need for maintenance or replacement of the light source 95.

Current requirements for LCDs are getting thinner, lighter and smaller. In the prior art, the V-shaped light guide member limits the possibility of thinner LCDs. Meanwhile, the prior art does disclose the concept of removing the light source from the bottom of the base 91. In addition, the prior art does not provide a method on how to combine or fasten the base 91 and the detachable base 92 together in detail. Therefore, there is a need for a new backlight design with a thinner backlight module and method to fasten the backlight module onto LCDs, with lower manufacturing costs.

BRIEF SUMMARY OF THE INVENTION

The invention provides a backlight apparatus and method to remove the light source module from the backlight module for maintenance. According to one embodiment, a backlight apparatus comprises a planar bezel having a lengthwise opening and a light source module. The planar bezel effectively reduces thickness of the backlight module. The light source module comprises a bar, a light source, and a fixing member. The bar is partially or totally disposed in the lengthwise opening. The light source is disposed on the bar and the lengthwise opening and the fixing member secures the planar bezel and the bar. Further, the fixing member may be a screw. A mount hole is provided in the planar bezel and a through hole corresponding to the mount hole is provided in the bar so that the planar bezel and the bar can be secured by the screw.

In another embodiment of the present invention, the bar of the backlight apparatus is disposed in the lengthwise opening and has a first surface facing inwardly and a second surface opposite to the first surface. The fixing member comprises a bottom portion disposed on the second surface and a top portion disposed on the first surface which adjusts with the bottom portion to fasten the light source module to the planar bezel.

In another embodiment of the present invention, a display device comprises a cover, a backlight apparatus, and a liquid crystal display module in front of the backlight module. Both the backlight module and the liquid crystal display module are disposed behind the cover. The backlight apparatus is designed to allow easy removal of the light source during maintenance. Therefore, shortening assembly time and saving manufacturing costs.

BRIEF DESCRIPTION OF THE DRAWINGS

The invention can be more fully understood by reading the subsequent detailed description and examples with references made to the accompanying drawings, where.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
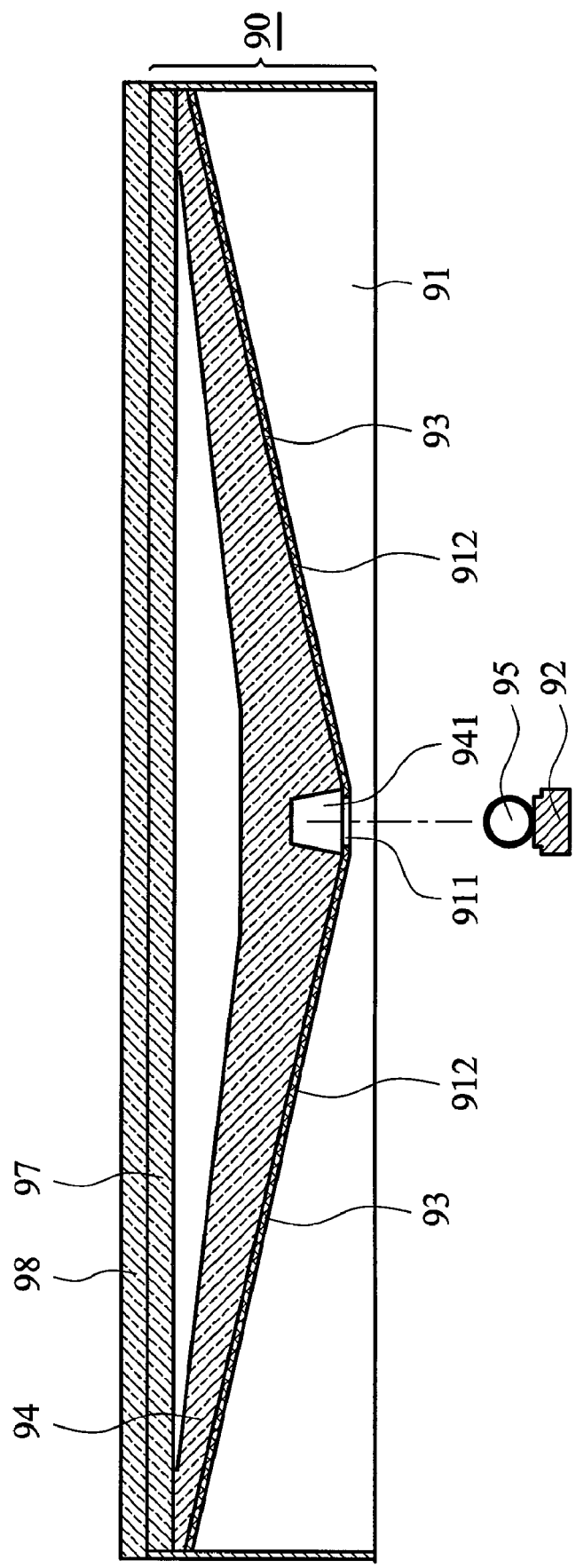
FIG. 1 is a schematic view showing a conventional backlight structure.
Figure 2:
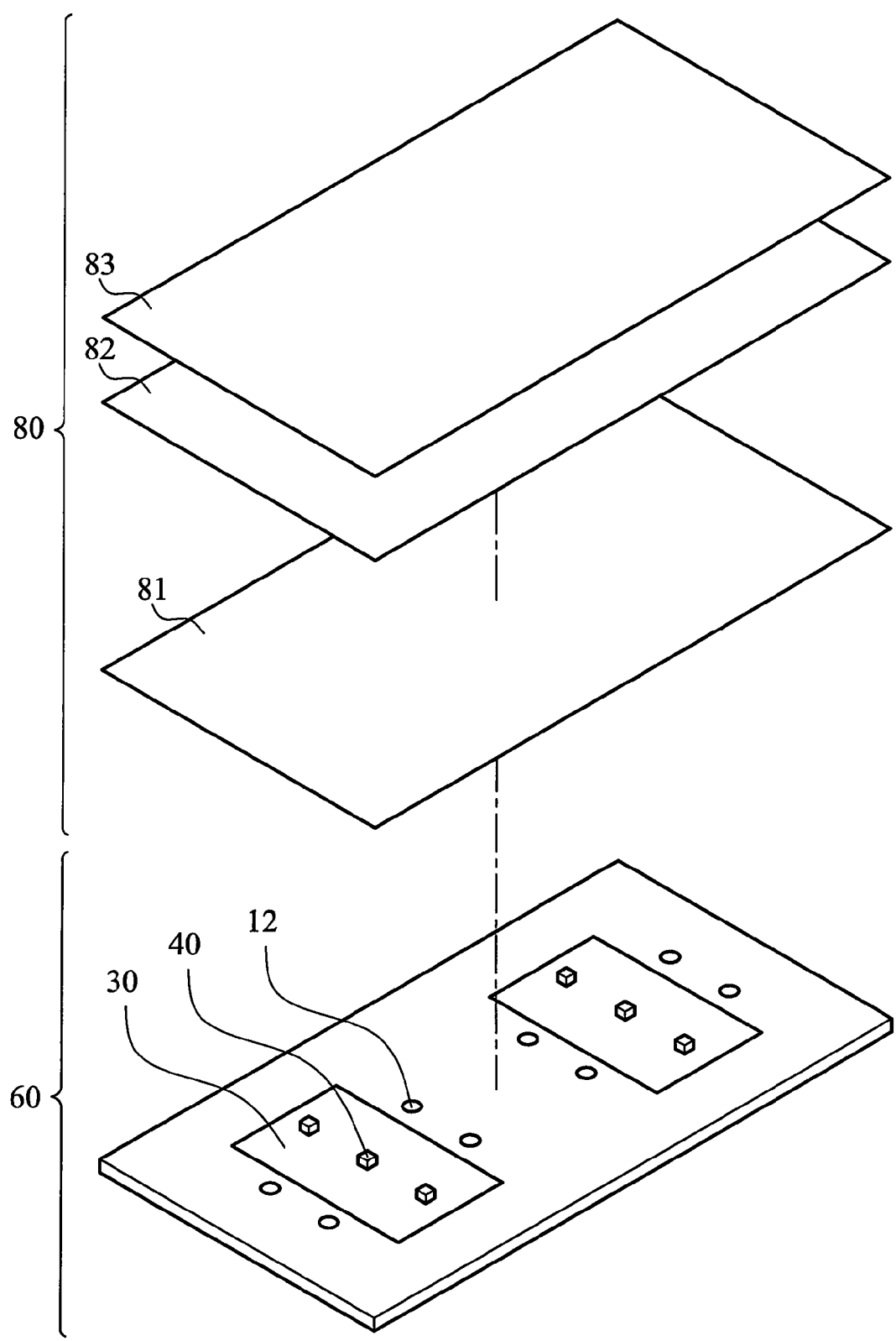
FIG. 2 is an exploded view for the backlight module according to a first embodiment of the present invention.

FIG. 2 is an exploded view of a backlight module according to the first embodiment of the present invention, wherein a set of optical films 80 is disposed on a backlight apparatus 60. The set of optical films 80 comprises a light guide plate 81, one or a plurality of brightness enhanced films 82 and a diffuser 83. It is understood that the structure of the optical films 80 described in the first embodiment is only for description of the backlight module rather than limiting the invention. General speaking, a plurality of openings (not shown) are provided on the bottom of the diffuser 83, allowing both penetration and reflection of light thereon. The purpose of light reflection is to increase the number of reflections of light between the diffuser 83 and the bezel (shown in FIG. 3), and the purpose of the light penetration is to avoid dark zones above the openings. Thus, significantly improving brightness uniformity of the display module.

Figure 3:
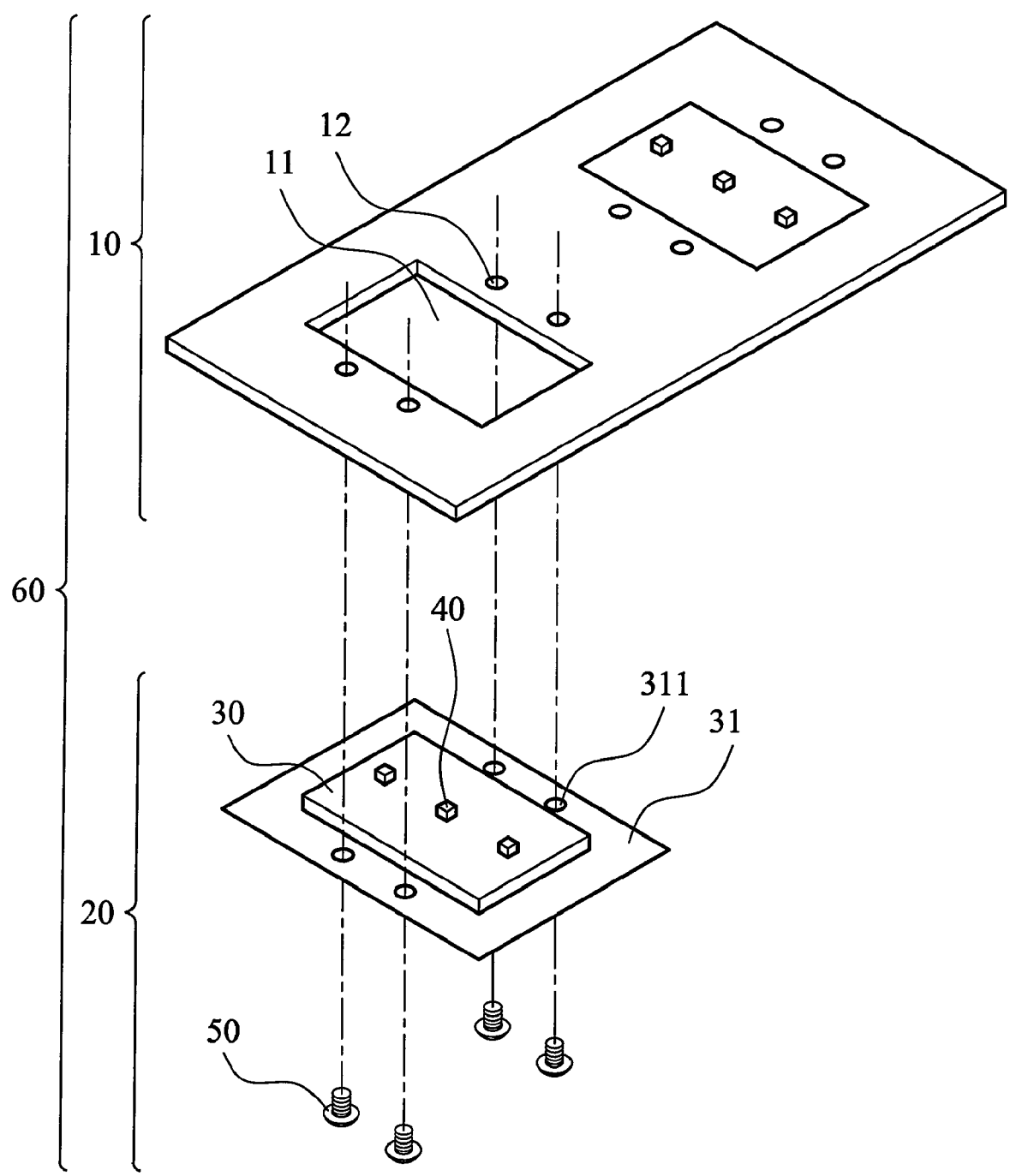
FIG. 3 is a schematic view showing the assembly for a backlight apparatus according to the first embodiment of the present invention.

As described, the backlight apparatus 60 is disposed under the set of optical films 80. FIG. 3 depicts the structure of the backlight apparatus, wherein the backlight apparatus 60 comprises a bezel 10 and a plurality of light source modules 20. In the first embodiment of the present invention, the bezel 10 is planar, thus significantly reducing the thickness of the display module. The bezel 10 is made of, for example, metal or plastic. Furthermore, the planar bezel 10 comprises a plurality of lengthwise openings 11 parallel to each other and a plurality of mount holes 12 disposed on both sides of each lengthwise opening 11. The mount holes 12 may be disposed adjacent to both ends of each lengthwise opening 11.

The light source module 20 comprises a bar 30, a plurality of light sources 40 and a plurality of fixing members 50. The bar 30 is partially or totally disposed in the lengthwise opening 11. Two extension parts 31 are provided on both sides of the bar 30. Thus, the bar 30 is slightly larger in width, than the lengthwise opening 11. Furthermore, a plurality of through holes 311 are provided in the extension parts 31 corresponding to the mount holes 12. During assembly, the bar 30 and the planar bezel 10 are firmly secured together by passing the fixing members 50 through the mount holes 12 and the through holes 311. The fixing member 50 can be a screw, a rivet, a bolt, or other fixing members. In FIG. 3, the light sources 40 are LEDs (Light Emitting Diodes) which are disposed on the bar 30 in the lengthwise opening 11. It is understood, however, that the light sources can be CCFLs (Cold Cathode Fluorescent Lamps) or others in which those with ordinary skill in the art can conceive and use.

Figure 4:
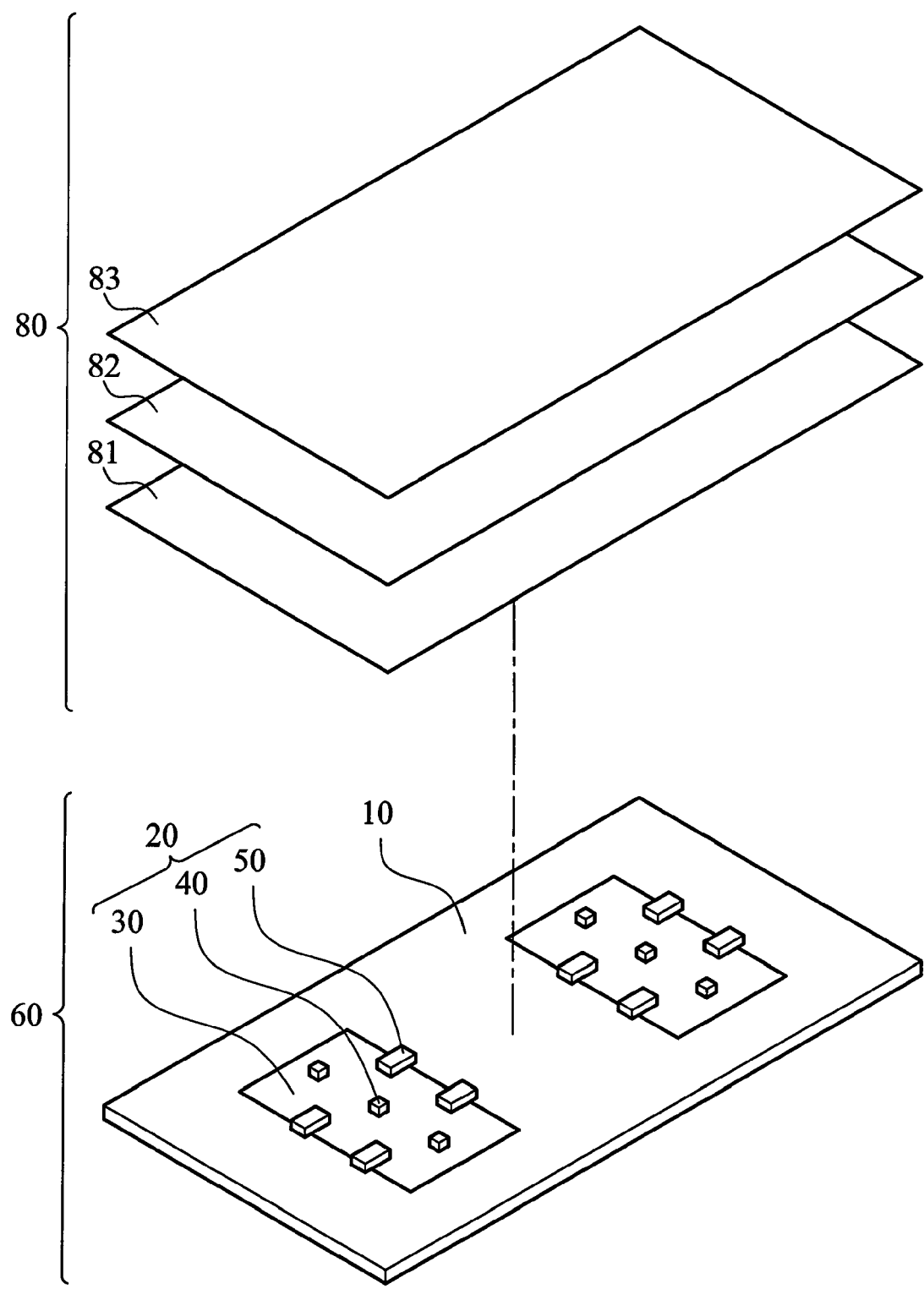
FIG. 4 is an exploded view for a backlight module according to a second embodiment of the present invention.

In a second embodiment of the present invention, the light source module 20 and planar bezel 10 is combined as a backlight system for a liquid crystal display. Please refer to FIG. 4. The reference numbers for components in FIG. 4 are the same as those in the first embodiment for illustration simplicity. In the second embodiment, the backlight module also comprises a set of optical films 80 and a backlight apparatus 60. The set of optical films 80 is disposed on the backlight apparatus 60. The set of optical films comprises a light guide plate 81, one or a few brightness enhanced films 82 and a diffuser 83, wherein the light guide plate 81 is disposed at the bottom with the brightness enhanced film 82 and the diffuser 83 is disposed thereon in sequence. It is understood that the structure of the optical films 80 described in the second embodiment, while only describing the backlight module, does not limit the invention.

Figure 5A:
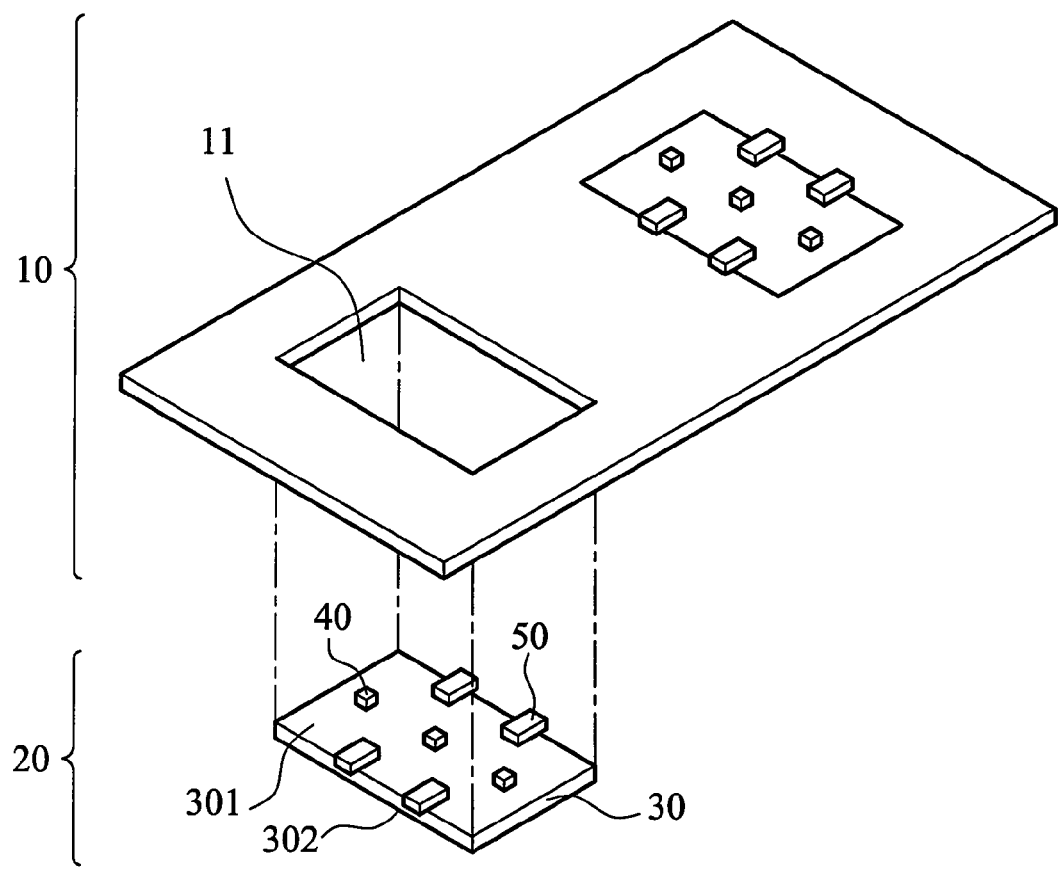
FIG. 5a is a schematic view showing the assembly for a backlight apparatus according to the second embodiment of the present invention.
Figure 5B:
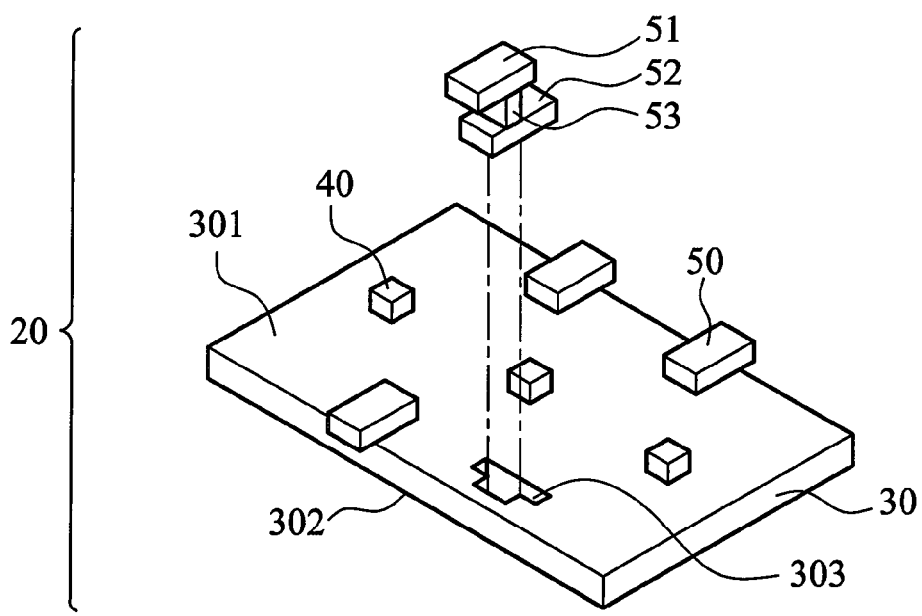
FIG. 5b is a schematic view showing the assembly for a light source bar according to the second embodiment of the present invention.

FIG. 5a and FIG. 5b, respectively depict the backlight apparatus and a light source module in the second embodiment, wherein the backlight apparatus 60 comprises a planar bezel 10 and a plurality of light source modules 20. The bar 30 is totally disposed in the lengthwise opening 11. The fixing members 50 are disposed on both sides of the bar 30 while the light sources 40 are disposed in the middle of the bar. The bar 30 has a first surface 301 facing inwardly, a second surface 302 opposite to the first surface 301, and through holes 303 penetrating the bar 30 from the first surface 301 to the second surface 302. The fixing member 50 may be a clip or similar means. The fixing member 50 comprises a top portion 51, a bottom portion 52 and a connection portion 53 connected between the top portion 51 and the bottom portion 52 as shown in FIG. 5b. The fixing member 50 is mounted on the bar 30 through the through hole 303, wherein the top portion 51 is movable on the first surface 301, the second surface 302 is movable on the second surface 302, and the connection portion 53 is disposed inside the through hole 303.

Figure 6A:
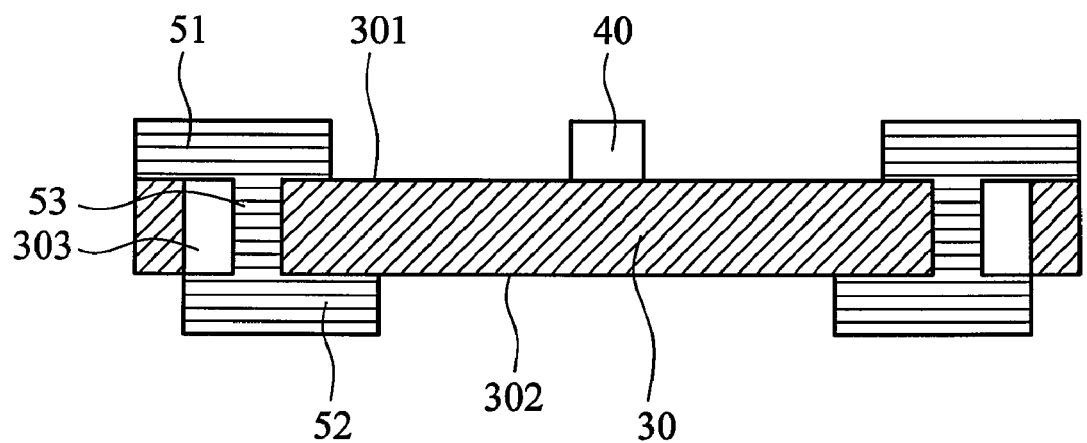
FIG. 6a depicts a cross section of a light source bar in an unfixed state according to the second embodiment of the present invention.
Figure 6B:
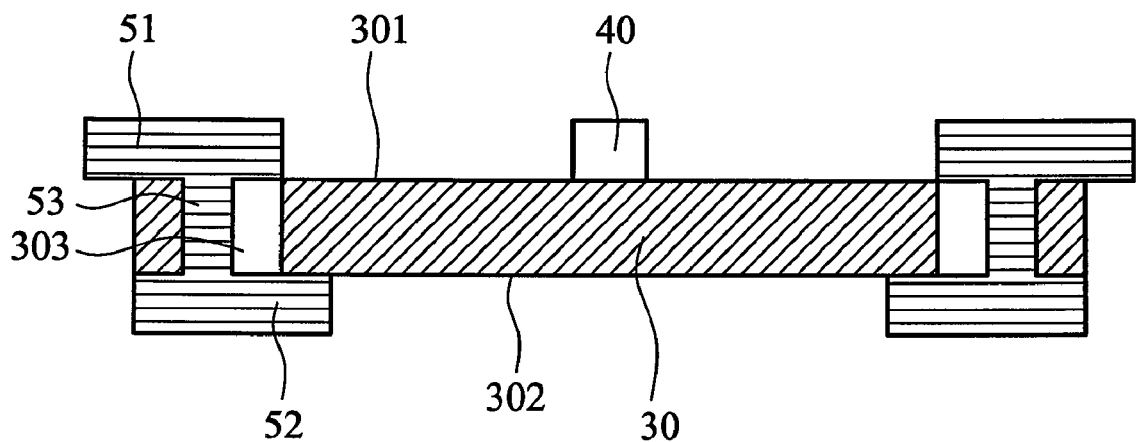
FIG. 6b depicts a cross section of a light source bar in a fixed state according to the second embodiment of the present invention.

The process of fastening the bar 30 to the planar bezel 10 is shown in FIGS. 6a and 6b. FIG. 6a shows the bar 30 in a unsecured state, wherein the light source module 20 is disposed in the lengthwise opening 11, and the top portion 51 of the fixing member 50 does not extend beyond the edge of the bar 30. FIG. 6b shows the bar 30 in a secured state. In order to fasten the bar 30 to the bezel 10, the bottom portion 52 of the fixing member 50 is pushed toward the outer edge of the bezel 10. The connection portion 53 and the top portion 51 are moved with the bottom portion 52 until the top portion 51 projects beyond the edge of the bar 30 and contacts the bezel 10, thus preventing a separation of the bar 30 from the bezel 10. Meanwhile, the top portion 51 of the fixing member 50 covers the through hole 303, thus preventing entry of dust.

Meanwhile, the bottom portion 52 can be pushed inward to release the bar 30 from the bezel 10 for parts replacement or maintenance of the light source module.

Figure 7A:
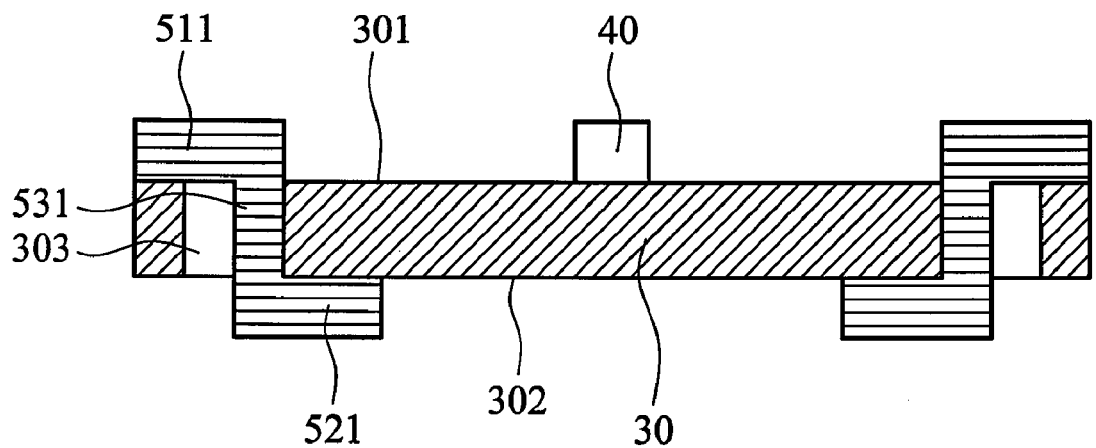
FIG. 7a depicts a cross section of a light source bar in an unfixed state according to a third embodiment of the present invention.
Figure 7B:
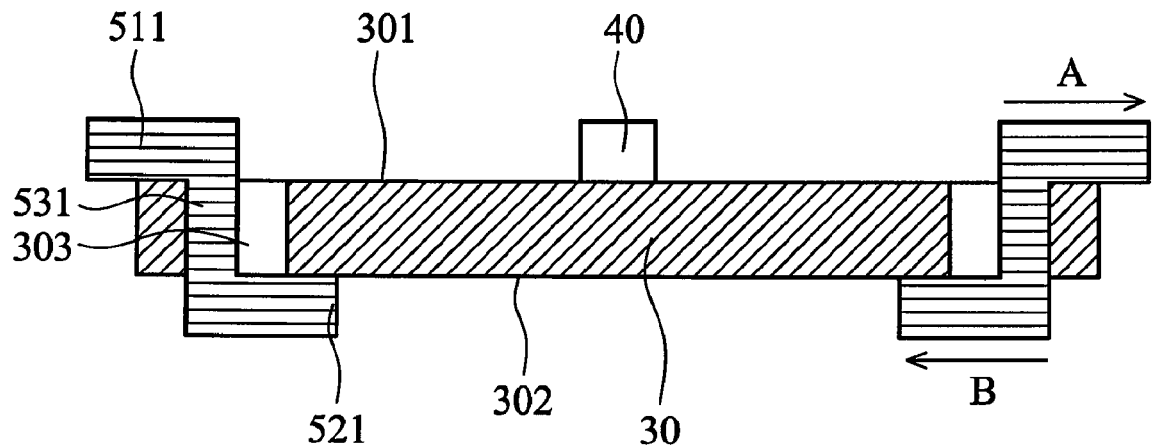
FIG. 7b depicts a cross section of a light source bar in a fixed state according to the third embodiment of the present invention.

FIGS. 7a and 7b depict fixing members in accordance with a third embodiment of the present invention. The top portion 511 is flat, parallel to the planar bezel 10, and extends from the connection portion 531 in direction A. In the third embodiment, the direction A is directed from the bar 30 toward the planar bezel 10. Similarly, the bottom portion 521 is flat, parallel to the planar bezel 10, and extends from the connection portion 531 in direction B. In the third embodiment, the direction B is directed from the planar bezel 10 toward the center of the bar 30, opposing the direction A.

Based on the structure mentioned above, when the bottom portion 521 is pushed in direction A, the top portion 511 moves along direction A accordingly toward the planar bezel 10 since the top portion 511 is connected to bottom portion 521 by the connection portion 53. Then the top portion 511 projects beyond the edge of the first surface 301 and contact the planar bezel 10 as shown in the FIG. 7b. Thus, the bar 30 is fixed to the planar bezel 10. At the same time, the bottom portion covers the hole 303 to prevent dust particles from entering the backlight apparatus 60.

Note that the described directions A and B are not intended to limit the invention. To the contrary, the directions A and B can be defined in opposite ways. For example, the direction A can be directed from the planar bezel 10 toward the center of the bar 30, while the direction B can be directed from the bar 30 toward the bezel 10.

Figure 8:
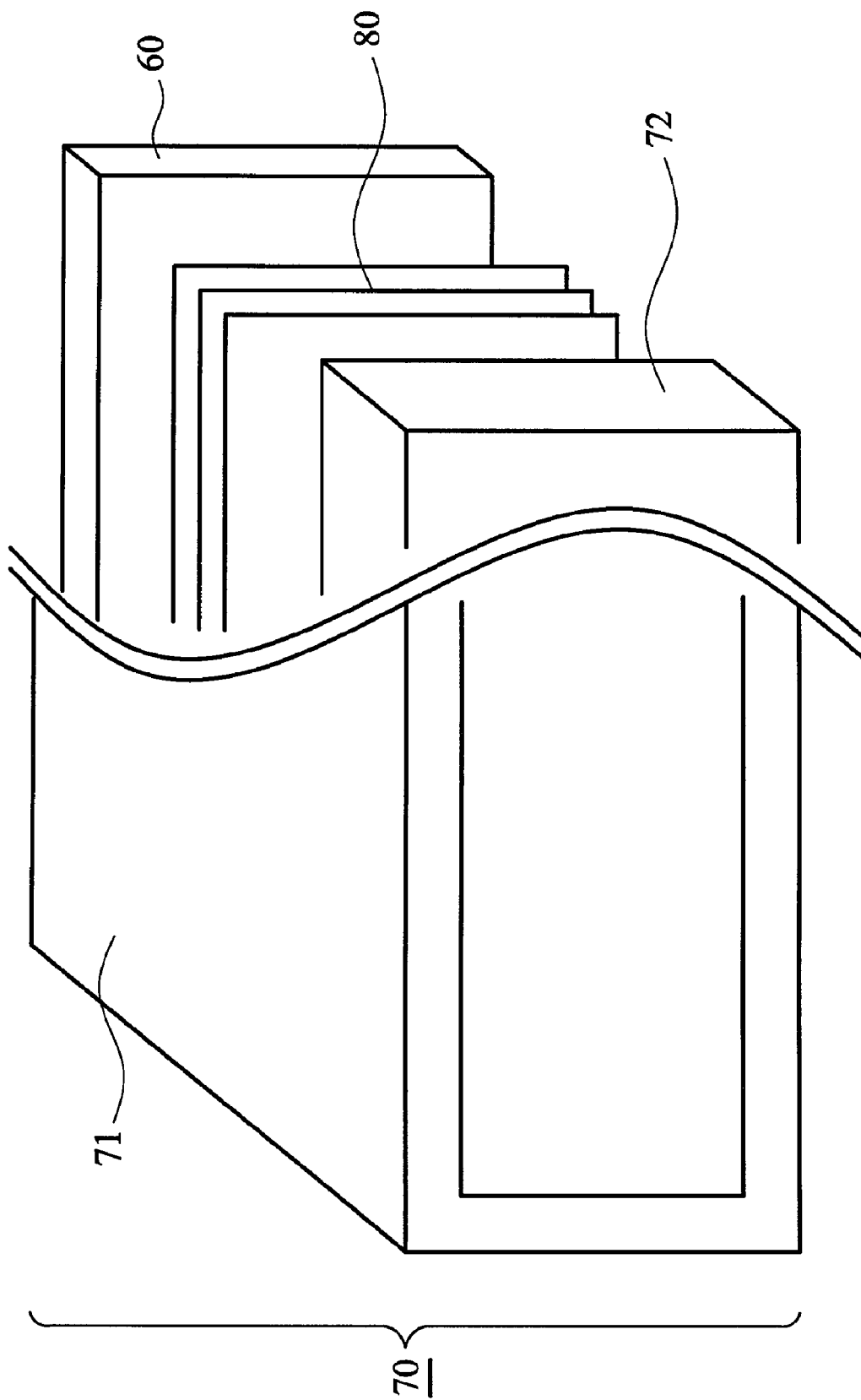
FIG. 8 is a schematic view showing the invention applied in a liquid crystal display device.

FIG. 8 shows a liquid crystal display containing the backlight apparatus 60 of the invention. The liquid crystal display 70 has a cover 71. The liquid crystal display module 72, a set of optical films 80, and a backlight apparatus 60 respectively from are disposed sequentially behind the cover 71. The backlight apparatus 60 provides light beams to the liquid crystal display module 72 through the set of optical films 80. When conducting maintenance for the backlight apparatus 60, the light source modules 20 can be directly removed from the backlight apparatus 60 without spending too much time to detach the backlight apparatus 60 from the liquid crystal display 70. Thus, increasing efficiency and lowering manufacturing costs.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight apparatus, comprising:
   a planar bezel having an opening; and
   a light source module comprising:
   a bar partially or totally disposed in the opening, having a first surface, a second surface opposite to the first surface, and a through hole penetrating the bar from the first surface to the second surface;
   a light source disposed on the first surface of the bar and received in the opening; and
   a fixing member securing the planar bezel and the bar, comprising a top portion movably disposed on the first surface, a bottom portion movably disposed on the second surface, and a connection portion disposed through the through hole to connect the bottom portion with the top portion;
   wherein one end of the bottom portion is fixed to the connection portion and the other end thereof extends along a first direction, and one end of the top portion is fixed to the connection portion and the other end thereof extends along a second direction opposite to the first direction, wherein the first and second directions are substantially parallel to the first and second surfaces.

2. The backlight apparatus as claimed in claim 1, wherein the light source comprises a light emitting diode.

3. The backlight apparatus as claimed in claim 1, wherein the light source comprises a cold cathode fluorescent lamp.

4. A display device, comprising:
   a cover;
   the backlight apparatus as claimed in claim 1 disposed behind the cover; and
   a liquid crystal display module disposed in front of the backlight apparatus.

5. The display device as claimed in claim 4, further comprising an optical module disposed between the backlight apparatus and the liquid crystal display module.

6. The display device as claimed in claim 4, wherein the light source comprises a light emitting diode.

7. The display device as claimed in claim 4, wherein the light source comprises a cold cathode fluorescent lamp.

* * * * *